United States Patent [19]

Laganis et al.

[11] 4,196,109

[45] Apr. 1, 1980

[54] PHENOLIC RESIN-TRIAZINE MODIFIER FOR ALKYD RESINS

[75] Inventors: Deno Laganis, Schenectady; Eric V. Garis, Scotia, both of N.Y.

[73] Assignee: Schenectady Chemicals, Inc., Schenectady, N.Y.

[21] Appl. No.: 934,795

[22] Filed: Aug. 17, 1978

[51] Int. Cl.$^2$ .................... C09D 3/52; C09D 3/56; C09D 3/66

[52] U.S. Cl. ........................ 260/20; 260/21; 428/458; 428/460

[58] Field of Search ............... 260/20, 21; 428/458, 428/460

[56] References Cited

U.S. PATENT DOCUMENTS

| | | | |
|---|---|---|---|
| 2,054,053 | 9/1936 | Hoffman | 260/838 |
| 2,174,132 | 9/1939 | Maisch | 427/393 |
| 2,205,427 | 6/1940 | Loos | 260/840 |
| 2,228,837 | 1/1941 | Maisch | 427/393 |
| 2,315,087 | 3/1943 | Cuvier | 260/840 |
| 2,388,676 | 11/1945 | Coffman et al. | 8/115.5 |
| 2,411,554 | 11/1946 | Riccitiello | 260/20 |
| 2,451,153 | 10/1948 | Charlton et al. | 260/839 |
| 2,500,054 | 3/1950 | Anthony et al. | 260/840 |
| 2,502,511 | 4/1950 | Davies et al. | 260/45.8 N |
| 2,523,334 | 9/1950 | Schroy et al. | 260/839 |
| 3,080,331 | 3/1963 | Thielking | 260/20 |
| 3,108,083 | 10/1963 | Laganis | 260/20 |
| 3,268,467 | 8/1966 | Rye et al. | 260/29.3 |
| 3,280,217 | 10/1966 | Lader et al. | 260/844 |
| 3,331,885 | 7/1967 | Rider et al. | 260/826 |
| 3,342,776 | 9/1967 | Lambuth | 528/147 |
| 3,434,992 | 3/1969 | Holtschmidt et al. | 260/29.3 |
| 3,479,307 | 11/1969 | Laganis | 260/20 |
| 3,498,940 | 3/1970 | Laganis | 260/20 |
| 3,567,689 | 3/1971 | Economy et al. | 528/231 |
| 3,617,428 | 11/1971 | Carlson | 428/182 |
| 3,620,902 | 11/1971 | Anderson et al. | 428/249 |
| 3,658,736 | 4/1972 | Daimer et al. | 260/19 A |
| 3,658,795 | 4/1972 | Daimer | 260/839 |
| 3,707,296 | 12/1972 | Palazzolo et al. | 260/839 |
| 3,734,918 | 5/1973 | Mayer et al. | 260/29.3 |
| 3,763,276 | 10/1973 | Kolyer et al. | 260/857 R |
| 3,878,136 | 4/1975 | Hofel et al. | 260/14 |
| 3,920,594 | 11/1975 | Sato et al. | 260/19 R |
| 3,947,393 | 3/1976 | Sato et al. | 260/19 N |
| 3,956,140 | 5/1976 | Nahm et al. | 252/8.5 C |
| 3,963,652 | 6/1976 | Tanimura et al. | 260/19 UA |
| 3,994,989 | 11/1976 | Kempter et al. | 260/831 |
| 4,002,582 | 1/1977 | Fritsche | 260/19 UA |
| 4,049,603 | 9/1977 | Elmer | 260/29.3 |

Primary Examiner—Ronald W. Griffin
Attorney, Agent, or Firm—Cushman, Darby & Cushman

[57] ABSTRACT

The invention is directed to alkyd resin compositions which contain, in addition to the alkyd (1) a phenolic resin containing carboxyl substituents and (2) a triazine derivative or a resinous condensation product thereof. Upon heat treatment, to effect curing, the alkyd resin compositions of the invention exhibit upgraded moisture resistance, improved bond strengths and improved chemical resistance. The alkyd resin composition can be rendered water-soluble.

29 Claims, No Drawings

PHENOLIC RESIN-TRIAZINE MODIFIER FOR ALKYD RESINS

The invention is directed to new, improved coatings for use as impregnating varnishes in electrical insulation applications, as well as in coreplate and other industrial applications.

BACKGROUND OF THE INVENTION

This invention is related to compositions comprising an alkyd resin, phenolic resin and a triazine derivative and to water-soluble coatings derived therefrom. The phenolic resin and triazine derivative serve to crosslink the alkyd. As crosslinking agents, the phenolic resin and triazine derivative not only accelerate the cure on baking, but also in specific proportions effect a synergistic upgrading of the moisture resistance of the ultimate coating as well. Furthermore, the ultimate coating is characterized by outstanding bond strengths at room and elevated temperatures along with excellent electrical properties.

Heretofore aqueous coatings employed as impregnating varnishes in electrical insulation applications have exhibited serious deficiencies in moisture resistance at elevated temperatures and highly humid conditions. This deficiency, coupled with low bond strengths at ambient and elevated temperatures, precluded their usage in various electrical and other industrial applications. Aqueous alkyd coatings with any of the variety of amino resins or derivatives thereof, as the sole curative, have exhibited poor elevated temperature moisture resistance. Traditional water-soluble phenol-formaldehyde resins are compatible with water-soluble alkyd systems in the solution state, but after being baked are incompatible in the cured state as exemplified by a cloudy, hazy or striated baked film. Organic solvent based phenolic-alkyd coating combinations were not compatible with water-soluble alkyd-amino resin compositions in solution or in the cured state.

Coatings of an alkyd which contain the phenolic resin component of the invention as the sole curative cure very slowly and do not possess the desired moisture resistance and bond strengths required in industry. Coatings based on said resins, when combined with triazine derivatives, show marked improvement in moisture resistance, thermal, chemical and mechanical properties over their phenolic-free counterparts.

The proportions of each of these two components, namely the phenolic resin system and said triazine derivatives, in modifying the alkyd resin in accordance with the invention are critical in realizing improved moisture resistance of the ultimate coatings.

SUMMARY OF THE INVENTION

The invention resides in a composition comprising the following components:
Alkyd resin
Phenolic resin
Triazine derivative or resin The alkyd resins are of the oil-modified types wherein the oil or fatty acid can be unsaturated or saturated. The oil strength or percentage of oil in the alkyd can range from 5 to 80% of the alkyd solids.

The phenolic resin systems include a formaldehyde reaction product in which formaldehyde is reacted with one of two phenolic mixtures. One of the phenolic mixtures includes (1) an ortho- or para-alkyl phenol,
(2) a polyhydroxyphenol, and
(3) an ortho- or para-hydroxy benzoic acid. The other mixture which can be reacted with formaldehyde to form a phenolic resin, used in accordance with the invention, includes
(1) p-t-butylphenol and
(2) 4,4'-bis(4-hydroxyphenyl)pentanoic acid or isomers thereof.

The triazine component may be a melamine or benzoguanamine derivative that is a reaction product of melamine or benzoguanamine and formaldehyde that has two or more methylol groups that are left free or preferably etherified with various alcohols to form distinct chemical compounds or derivatives. Also these derivatives may be condensed to form resinous amino products.

The proportions of the phenolic resin and the triazine derivative or resin in the alkyd affect the moisture resistance properties of the baked and cured alkyd.

DESCRIPTION OF PREFERRED EMBODIMENTS

The three component alkyd composition of the invention includes the alkyd, the phenolic resin system and the triazine derivative or resin. The three component alkyd composition can be rendered water-soluble to form coatings, of the invention, which can be used as impregnating type insulating varnishes.

ALKYD COMPONENT

One of the principal components in the preparation of an impregnating type of insulating varnish is an alkyd of the oil- or fatty acid-modified type. The oil or fatty acid may be of the saturated or unsaturated type wherein, in the latter type, the fatty acid contains one or more double bonds per molecule.

These alkyd resins can be prepared by a variety of techniques. If an oil (drying or non-drying triglyceride type) is chosen, then it is reacted with a polyhydric alcohol to undergo an ester-interchange or alcoholysis thereof, and subsequently esterified with an aromatic dicarboxylic acid, such as isophthalic acid, to form the first stage of the alkyd prepolymer. In the second stage, a variety of saturated, and unsaturated dicarboxylic acids or anhydrides thereof of the aliphatic, cycloaliphatic or aromatic types are added as solubilizing reactants and esterified at temperatures ranging from 150° C. to about 200° C. until an acid number of 20 to 100 on the solid resin is attained.

Another and more preferred technique is to start with the fatty acids and prereact them with polyhydric alcohols or a combination of polyhydric and dihydric alcohols and aromatic dicarboxylic acids to an acid number ranging from 10 to 30 on a solids basis for the first stage. The second stage is then carried out exactly as described above. Employing fatty acid reactants, rather than oils, allows greater selection in the choice of fatty acid and polyhydric alcohol employed.

In formulating these alkyd resins the oil length or percentage of oil may range from 5 to 80% of the alkyd solids. Also the hydroxyl to carboxyl ratio (OH/COOH) on an equivalent basis can be varied from 1/1 to 1.50l. The unsaturated fatty acids contain one or more double bonds per molecule, and where two or more double bonds are present, they may be in conjugated or unconjugated positions. The saturated monocarboxylic acids may range from 8 to 24 carbons in length.

The esterification or condensation reaction is followed by measuring the viscosity of a sample at a certain solids and the acid number of a sample by titrating it with alcohol or aqueous potassium hydroxide solution (0.1 N) to determine the number of milligrams of potassium hydroxide equivalent to the acidity of one gram of resin. When the desired viscosity and acid number are attained the alkyd component is cooled to 150° C. and thinned with a solvent, such as a glycol ether, to about 70 to 90% solids to form the alkyd concentrate.

The polyhydric alcohols that are preferred include trimethylol propane, trimethylol ethane, glycerine, tris(hydroxyethyl) isocyanurate, and pentaerythritol.

The dihydric alcohols that are preferred include neopentyl glycol, ethylene glycol, propylene glycol, 1,3-butylene glycol, diethylene glycol, dipropylene glycol, 1,4-cyclohexane dimethanol, dimethylol hydantoin, and 1,6-hexanediol.

The preferred aromatic dicarboxylic acids are isophthalic acid, terephthalic acid and benzophenone dicarboxylic acid.

A variety of solubilizing reactants for the second stage of the alkyd cook may be employed. They are di- or tricarboxylic acids or anhydrides of the aliphatic, cycloaliphatic or aromatic types and include the following:

DIACIDS:

(a) Aliphatic—succinic acid, glutaric acid, adipic acid, azelaic acid, sebacic acid, maleic acid or its anhydride, fumaric acid, itaconic acid or its anhydride, tetrapropenyl succinic anhydride, etc.

(b) Cycloaliphatic—tetrahydrophthalic anhydride, hexahydrophthalic anhydride, 1,4-cyclohexanedicarboxylic acid, and 3,6-endo-methylene-4-tetrahydrophthalic anhydride.

(c) Aromatic—phthalic acid or its anhydride.

TRIACIDS:

Aromatic—trimellitic anhydride

Oils which can be used in making the oil-modified alkyds include soybean oil, cottonseed oil, linseed oil, safflower oil, corn oil, tung oil, menhaden oil, tall oil, castor oil, palm oil, coconut oil, perilla oil, rapeseed oil, grapeseed oil, sunflower oil, oiticica oil, etc.

The fatty acids preferably contain 8 to 18 carbon atoms, and may be saturated or unsaturated types, and include the following:

Saturated—pelargonic acid, octanoic acid, lauric, myristic, palmitic acid, stearic acid, and isodecanoic acid.

Unsaturated—either unconjugated or conjugated types, such a linoleic acid, linolenic acid, ricinoleic acid, oleic acid, elaeostearic acid, and fatty acid mixtures from soybean oil, cottonseed oil, linseed oil, and tall oil.

The alkyd solids are formed by reacting 3 to 60 weight percent of the alcoholic component (diols and/or triols) with 40 to 97 weight percent of acid reactants. When trimellitic anhydride is admixed with an aromatic dicarboxylic acid, e.g. isophthalic acid or terephthalic acid, (for reaction with the alcoholic component), 0.1 to 0.5 mole of trimellitic anhydride (TMA) is reacted with one mole of the said aromatic dicarboxylic acid. When a mixture of aliphatic (and/or cycloaliphatic) polycarboxylic acids with the dicarboxylic aromatic acid is used, the aliphatic is used in an amount of 0.1–0.7 mole per mole of said dicarboxylic aromatic acid. When mixtures of TMA, said aliphatic dicarboxylic acid and/or cycloaliphatic diacid and said aromatic dicarboxylic acid are used, the mixture comprises 25 to 75 mole percent of the combined amounts of said TMA, and said aliphatic and/or said cycloaliphatic diacid.

EXAMPLES

The examples of alkyds described hereinafter serve to illustrate the invention without in any manner limiting its scope.

A. DRYING OIL-ALKYDS

EXAMPLE 1

| | Reactants | Wt. Grams | Equivalents | Moles |
|---|---|---|---|---|
| (A) | Soybean Oil Fatty Acids | 314 | 1.12 | 1.12 |
| (B) | Isophthalic Acid | 930 | 11.20 | 5.60 |
| (C) | Trimethylolpropane | 345 | 7.73 | 2.58 |
| (D) | Neopentyl Glycol | 681 | 13.10 | 6.55 |
| (E) | Trimellitic Anhydride | 323 | 5.04 | 1.68 |

% Oil (after reaction): 14.5

Materials (A), (B), (C) and (D) are charged to a five-liter, three-neck round bottom glass flask equipped with a motor driven stainless steel paddle agitator, a thermometer to record batch temperature, a Snyder fractionating column, a condenser, a receiver to collect the distillate evolved, and an inert gas sparge tube. Inert gas or nitrogen was turned on and sparged through the flask's sparge tube, and shortly thereafter the agitator was turned on along with heat applied by means of a Glas-Col heating mantle. The temperature was gradually increased over a period of 4 to 5 hours to a temperature range of 210°–215° C., and maintained there until an acid number of 26.3 at 100% solids was obtained and 225 mls. of distillate had been collected.

The contents of the flask were cooled to 150° C., and material (E) was added to the flask. At this point the fractionating column was replaced by a Dean-Stark water trap. Heating was resumed, and the temperature was increased to 165°–170° C., and held there until a sample thinned to 65% solids in methoxy propanol had a final viscosity of T ½ and an acid number of 34.5 at this solids. The molten polymer was subsequently thinned to 80% solids in butoxy ethanol. This alkyd concentrate was later compounded into various varnishes. For further details consult section on "Preparation of Coating Compositions".

EXAMPLE 2

| | Reactants | Wt. Grams | Equivalents | Moles |
|---|---|---|---|---|
| (A) | Soybean Oil Fatty Acids | 470 | 1.68 | 1.68 |
| (B) | Isophthalic Acid | 930 | 11.20 | 5.60 |
| (C) | Trimethylolpropane | 434 | 9.71 | 3.24 |
| (D) | Neopentyl Glycol | 613 | 11.79 | 5.90 |
| (E) | Trimellitic Anhydride | 323 | 5.04 | 1.68 |

% Oil (after reaction): 30

PROCEDURE

This example employed the same equipment and processing technique as cited in Example 1. It was processed to a final viscosity of U- at 65% solids in methoxy propanol and an acid number of 30.9 at this solids. A total of 237 mls. of distillate was collected. The molten polymer was subsequently diluted to 80% solids in butoxy ethanol. Consult section of "Preparation of Coating Compositions" for details on varnishes compounded with this alkyd concentrate.

EXAMPLE 3

| | Reactants | Wt. Grams | Equivalents | Moles |
|---|---|---|---|---|
| (A) | Soybean Oil Fatty Acids | 627 | 2.24 | 2.24 |
| (B) | Isophthalic Acid | 930 | 11.20 | 5.60 |
| (C) | Trimethylolpropane | 522 | 11.70 | 3.90 |
| (D) | Neopentyl Glycol | 545 | 10.48 | 5.24 |
| (E) | Trimellitic Anhydride | 323 | 5.04 | 1.68 |

% Oil (after reaction):25.3

PROCEDURE

This example employed the same equipment and processing techniques as cited in Example 1. It was processed to a final viscosity of T ¾ at 65% solids in methoxy propanol and an acid number of 34.1 at this solids. A total of 237 mls was collected. The molten polymer was subsequently diluted to 80% solids in butoxyethanol. For varnishes prepared with this alkyd concentrate consult section on "Preparation of Coating Compositions".

EXAMPLE 4

| | Reactants | Wt. Grams | Equivalents | Moles |
|---|---|---|---|---|
| (A) | Soybean Oil Fatty Acids | 672 | 2.40 | 2.40 |
| (B) | Isophthalic Acid | 797 | 9.60 | 4.80 |
| (C) | Trimethylolpropane | 511 | 11.43 | 3.81 |
| (D) | Neopentyl Glycol | 393 | 7.56 | 3.78 |
| (E) | Trimellitic Anhydride | 288 | 4.50 | 1.50 |

% Oil (after reaction):30

PROCECURE

This example employed the same equipment and processing technique as cited in Example 1. It was processed to a final viscosity of T ¾ at 65% solids in methoxy propanol and an acid number of 28.8 at this solids. A total of 208 mls. of distillate was collected. The molten polymer was thinned to 80% solids in butoxy ethanol. For varnishes prepared with this alkyd concentrate consult section on "Preparation of Coating Compositions".

EXAMPLE 5

| | Reactants | Wt. Grams | Equivalents | Moles |
|---|---|---|---|---|
| (A) | Tall Oil Fatty Acid (less than 2% rosin) | 1231 | 4.20 | 4.20 |
| (B) | Isophthalic Acid | 797 | 9.60 | 4.80 |
| (C) | Trimethylolpropane | 784 | 17.55 | 5.85 |
| (D) | Dipropylene Glycol | 80 | 1.20 | 0.60 |
| (E) | Trimellitic Anhydride | 259 | 4.05 | 1.35 |

% Oil (after reaction):46.9

PROCEDURE

This example employed the same equipment and processing technique as cited in Example 1. It was processed to a final viscosity of Z2 at 75% solids in methoxy propanol and an acid number of 45.4 at this solids. A total of 225 mls. of distillate was collected.

To demonstrate that these alkyds are soluble in various glycol ethers, the molten polymer of Example 5 was divided into various portions and subsequently thinned in the following cosolvents whose alkyd concentrates have the following liquid properties:

| | Alkyd Concentrates | | | | | | |
|---|---|---|---|---|---|---|---|
| | 1 | 2 | 3 | 4 | 5 | 6 | 7 |
| Viscosity at 25° C. | Z5 ½ | Z4 ¾ | Z6 ¼ | Z6 ½ | Z6 ½ | Z6 | Z7 ¼ |
| % Solids | 80 | 80 | 80 | 80 | 80 | 80 | 80.7 |
| Solvent | methoxy propanol | ethoxy ethanol | propoxy propanol | butoxy propanol | butoxy propanol | methoxy diethanol | butoxy ethanol |

A considerable number of varnishes were prepared with alkyd concentrate #7 and some with #1 and #2 which are listed under section on "Preparation of Coating Composition".

EXAMPLE 6

| | Reactants | Wt. Grams | Equivalents | Moles |
|---|---|---|---|---|
| (A) | Soybean Oil Fatty Acids | 1540 | 5.50 | 5.50 |
| (B) | Isophthalic Acid | 531 | 6.40 | 3.20 |
| (C) | Trimethylolpropane | 766 | 17.16 | 5.72 |
| (D) | Trimellitic Anhdride | 154 | 2.40 | 0.80 |

% Oil (after reaction):60.5

PROCEDURE

This example employed the same equipment and processing technique as cited in Example 1. It was processed to a final viscosity of I at 75% solids in methoxy propanol and an acid number of 26.8 at these solids. A total of 190 mls. of distillate was collected. The molten polymer was subsequently thinned to 80% solids in butoxy ethanol, and its varnishes are cited under section entitled "Preparation of Coating Compositions".

B. PREPARATION OF A NON-DRYING OIL-MODIFIED ALKYD

EXAMPLE 7

A. STARTING WITH A SATURATED FATTY ACID

| | Reactants | Wt. Grams | Equivalents | Moles |
|---|---|---|---|---|
| (A) | Pelargonic Acid | 506 | 3.20 | 3.20 |
| (B) | Isophthalic Acid | 996 | 12 | 6 |
| (C) | Neopentyl Glycol | 312 | 6 | 3 |
| (D) | Trimethylol propane | 761 | 17.04 | 5.68 |

-continued

| | Reactants | Wt. Grams | Equi-valents | Moles |
|---|---|---|---|---|
| (E) | Tetrahydrophthalic Anhydride | 304 | 4 | 2 |

% Oil (after reaction):23.6

PROCEDURE

This example employed the same equipment and processing technique as cited in Example 1. It was processed to a final viscosity of Z at 75% solids in methoxy propanol and an acid number of 34.3 at these solids. A total of 239 mls. of distillate was collected. The molten polymer was subsequently thinned to 80% solids in butoxy ethanol, and its varnishes are cited under section entitled "Preparation of Coating Composition".

B. STARTING WITH AN OIL

EXAMPLE 8

| | Reactants | Wt. Grams | Equivalents | Moles |
|---|---|---|---|---|
| (A) | Castor Oil (CP grade) | 1120 | 3.60 | 1.20 |
| (B) | Isophthalic Acid | 797 | 9.60 | 4.80 |
| (C) | Trimethylolpropane | 507 | 11.34 | 3.78 |
| (D) | Neopentyl Glycol | 221 | 4.26 | 2.13 |
| (E) | Trimellitic Anhydride | 230 | 3.60 | 1.20 |

% Oil (after reaction):41.3

PROCEDURE

The same equipment and processing technique was employed as cited in Example 1, except in the first stage it was reacted to an acid number of 27 at 65% solids in methoxy propanol instead of at 100% solids, and a viscosity of F ½. In the second stage of the reaction it was processed to a final viscosity of U at 65% solids in methoxy propanol and an acid number of 36 at this solids. A total of 138 mls. of distillate was collected. The molten polymer was subsequently thinned to 80% solids in butoxy ethanol, and its varnishes are cited under section entitled "Preparation of Coating Compositions".

Phenolic Resin Component

The uniqueness of the coating composition resides in the phenolic resin system which is used, in accordance with the invention. The invention embraces two types (Type A and Type B below) of phenolic resins:

Phenolic Resin Type A

This phenolic resin is the condensation product of formaldehyde with three types of phenols. The first type is one or more mono-alkyl-phenols where the alkyl group is methyl, ethyl, propyl, butyl, amyl, hexyl, heptyl, octyl, nonyl, decyl, undecyl, dodecyl or isomers thereof substituted in the ortho- or para positions. The alkyl phenols may constitute from 50 to 90 mole percent of the total phenolic moles. The second type of phenolic monomer may comprise three to twenty mole percent of the total. This type consists of one or more polyhydroxy phenols such as 2,2-bis(4-hydroxyphenyl)methane; 2,2-bis(4-hydroxyphenyl)ethane or 2,2-bis(4-hydroxyphenyl)-propane or isomers thereof in addition to bisphenols based on different alkylidene groups (e.g. methyl ketones) or heteroatoms as in 4,4'-sulfonyldiphenol. Dihydroxyphenols like resorcinol and hydroquinone can also be used. The third type of phenol monomer is one or both ortho-hydroxy or para-hydroxy benzoic acids comprising from seven to forty mole percent, preferably not over 35 mole percent, of the total phenolic moles.

The phenolic monomers are condensed under alkaline conditions preferably with an alkali metal hydroxide and 1.5 to 3.0 moles, preferably 2 to 3 moles, of formaldehyde for every mole of phenolic monomer. After the condensation is completed, the resin mixture is acidified, and washed with water. The resin mixture may be dissolved in a cosolvent and neutralized with an amine. Excess volatiles may be removed by distillation prior to use.

EXAMPLES

The following examples listed in Table 1 illustrate the invention without limiting its scope.

EXAMPLE 9. PHENOLIC RESIN TYPE A

To the stirred mixture of 500 g o-cresol, 49 g of 2,2-bis(4-hydroxyphenyl) propane, 83.1 g of salicyclic acid, 211.8 g of water, 211.8 g of toluene is added 92.9 g of 50% sodium hydroxide. The temperature is adjusted to 45°–55° C. and 742.8 g of aqueous 44% formaldehyde is added. The mixture is held at 45°–55° C. for 3 hours and heated to 85°–90° C. for 35 minutes. The reaction mixture is then cooled to 45°–55° C. and 211.8 g of 20% aqueous hydrochloric acid is added with agitation. The aqueous layer is phase separated and 206 g of butoxypropanol is added. The mixture is then washed with water and neutralized with 48.2 g of dimethylethanolamine. The batch is distilled to 47° C. at 28" vacuum. 206 g of butoxypropanol and 206 g of water are added to the batch. Distillation is continued to 58° C. at 28" vacuum. The product had a non-volatile content of 74% and a viscosity of Z1–Z2.

EXAMPLE 10. PHENOLIC RESIN TYPE A

To the stirred mixture of 480 g p-t-butylphenol, 135.9 g of bisphenol A, 230.3 g of salicyclic acid, 587 g of water and 587 g of toluene are added 257.5 g of 50% aqueous sodium hydroxide. The temperature is adjusted to 50° C. and 745.2 g of 44% aqueous formaldehyde is added. The batch is held at 50°–55° C. for 3 hours and heated to 87° C. After 35 minutes at 87° C., the batch is cooled to 50° C. and 587 g of 20% aqueous hydrochloric acid is added with agitation. The aqueous layer is separated and 500 g of toluene is added to the batch. The batch is washed with water and neutralized with 133.4 g of dimethylethanolamine. Volatile materials are removed by distilling to 37° C. at 28.5" vacuum. 300 g of butoxyethanol and 300 g of water are added, and the batch is distilled to 60° C. at 28" vacuum. The product had a viscosity of Z4–Z5 and a non-volatile content of 84.6%.

EXAMPLE 11. PHENOLIC RESIN TYPE A

To the stirred mixture of 367 g p-t-nonylphenol, 190.3 g of 2,2-bis(4-hydroxyphenyl)-propane, 230.3 g of salicylic acid, 587 g of water and 587 g of toluene is added 258 g of 50% sodium hydroxide. The temperature is adjusted to 45°–55° C. and 854 g of aqueous 44% formaldehyde is added. The batch is held at 45°–55° C. for 3 hours and heated to 86° C. After 2 minutes at 86° C., the batch is cooled quickly to 30°–35° C. At 25° C., 587 g of 20% aqueous hydrochloric acid is added with agitation. The mixture is heated to 50° C. and the aqueous phase is separated. 500 g of butoxypropanol is added and the mixture is washed with water, neutralized with 133.4 g of dimethylethanolamine and distilled to 60° C. at 25" vacuum. 400 g of water and 300 g of butoxypropanol are added and the batch was distilled to 60° at 28" vacuum. The cooled product had a viscosity of A- and a non-volatile content of 45%.

Examples 12-20 listed in Table 1 were undertaken in a similar manner.

PHENOLIC RESIN TYPE B

This phenolic resin system is the condensation product of formaldehyde with two types of phenols. The first type of phenol used in Phenolic Resin Type B is p-t-butylphenol, and the second type is 4,4'-bis(4-hydroxyphenyl)pentanoic acid [also known as diphenolic acid] or isomers thereof. It is expected that equivalents of the p-t-butylphenol, in this Phenolic Resin Type B will be encompassed by the group consisting of o- or p-monoalkyl substituted phenols, wherein the alkyl contains 1 to 12 carbon atoms and is straight chain or branched.

The 4,4'-bis(4-hydroxyphenyl)pentanoic acid, or isomers thereof, comprise 3-15 mole percent of both of said phenols used to form the Phenolic Resin Type B.

The phenolic monomers are condensed with formaldehyde under alkaline conditions, preferably, with an alkali metal hydroxide as the catalyst. The reaction mixture is then acidified and washed with water. The product can then be neutralized with an amine and dissolved in a solvent prior to removal of volatiles by distillation.

EXAMPLE 21. PHENOLIC RESIN TYPE B

To the stirred mixture of 1127 g of p-t-butylphenol, 238.7 g of 4,4'-bis(4-hydroxyphenyl)pentanoic acid and isomers (diphenolic acid), 294 g of water and 294 g of toluene is added 128.8 g of 50% aqueous sodium hydroxide. The batch temperature is adjusted to 50° C. and 1138 g of 44% aqueous formaldehyde is added. The batch temperature is maintained at 48°-55° C. for 3 hours. With agitation, 314 g of 20% aqueous hydrochloric acid is added at 50° C. The aqueous layer is separated and 300 g of butoxypropanol is added. The batch is washed with water, neutralized with 66.7 g of dimethylethanolamine and distilled to 58° C. at 25" vacuum. 200 g of butoxypropanol and 200 g of water are added and the batch is distilled to 52° C. at 28-29" vacuum. The product had a non-volatile content of 66.8% and a viscosity of Z-Z1.

Table 1

| Phenolic Molar Compositions and Physical Properties | | | | | | | | |
|---|---|---|---|---|---|---|---|---|
| Examples | | 9 | 10 | 11 | 12 | 13 | 14 | 15 |
| Mole percent Alkyl phenols | o-Cresol | 85 | | | 90 | 35.85 | 35 | |
| | p-t-butyl phenol | | 58.6 | | | | | 87 |
| | p-t-octyl phenol | | | | | | | |
| | p-t-nonyl phenol | | | 40 | | | | |
| | p-t-dodecyl phenol | | | | | 35.85 | 35 | |
| Mole percent Polyhydroxy phenols | 2,2-bis(4-hydroxy phenyl) propane | 3.9 | 10.9 | 20 | 3 | | 10 | 5 |
| | 4,4'-sulfonyl diphenol | | | | | 7.45 | | |
| | Resorcinol | | | | | | | |
| Mole percent Carboxy phenols | Salicylic acid | 11.1 | 30.5 | 40 | 7 | 20.85 | 20 | 7.6 |
| | 4,4'-bis(4-hydroxy phenyl) Pentanoic acid | | | | | | | |
| Moles Formaldehyde/ Total Phenol Moles (F/P) | | 2.0 | 2.0 | 3.0 | 2.0 | 2.0 | 2.0 | 1.5 |
| Solvent | | P | B | P | P | P | P | B |
| Percent NV (2 g, 1 Hr. at 135° C. forced air oven) | | 74 | 84.6 | 45 | 70 | 67.8 | 60 | 75.2 |
| Resin Type | | A | A | A | A | A | A | A |

Table 1-continued
Phenolic Molar Compositions and Physical Properties

| Gardner-Holdt Visc. at 25° C. | | | Z1-Z2 | Z4-Z5 | A- | Y-Z | U-V | I-J | Z |
|---|---|---|---|---|---|---|---|---|---|
| Examples | | | 16 | 17 | 18 | 19 | 20 | | 21 |
| Mole percent Alkyl phenols | | o-Cresol | | | | | | | |
| | | p-t-butyl phenol | 71.7 | 60 | | | | | 90 |
| | | p-t-octyl phenol | | | 71.7 | 50 | | | |
| | | p-t-nonyl phenol | | | | | 60 | | |
| | | p-t-dodecyl phenol | | | | | | | |
| Mole percent Poly-hydroxy phenols | | 2,2-bis (4-hydroxy-phenyl) propane | 7.4 | | | 15 | | | |
| | | 4,4'-sulfonyl diphenol | | 10 | | | 10 | | |
| | | Resorcinol | | | 7.45 | | | | |
| Mole percent carboxy phenols | | Salicylic acid | 20.9 | 30 | 20.85 | 35 | 30 | | |
| | | 4,4'-bis (hydroxy-phenyl) Pentanoic acid | | | | | | | 10 |
| Moles Formaldehyde/ Total Phenol Moles (F/P) | | | 1.9 | 2.0 | 3.0 | 3.0 | 2.0 | | 2.0 |
| Solvent* | | | B | P | P | P | P | | P |
| Percent NV (2 g, 1 Hr. at 135° C. forced air oven) | | | 69.8 | 57.8 | 74 | 70.5 | 58.6 | | 66.8 |
| Resin Type | | | A | A | A | A | A | | B |
| Gardner-Holdt Visc. at 25° C. | | | U-V | E-F | Z3-Z4 | Y-Z | G-H | | Z-Z1 |

*Solvent Type:
P is butoxypropanol
B is butoxyethanol

TRIAZINE DERIVATIVE COMPONENT

The triazine component may be a melamine or benzoguanamine reaction product with formaldehyde such that two or more methylol groups are formed which may be left intact or partially or fully etherified with a variety of alcohols. These products may be used as monomers or low molecular weight polymers possessing water solubility.

Etherification of the methylol groups of the triazine formaldehyde derivative is conventionally undertaken by condensing said derivative with an alcohol, e.g. methanol or butanol, in the presence of an acid catalyst.

Triazine products with varying methylol contents in which the hydroxyl groups are in the free or non-etherified state provide varnishes with excellent properties, but offer limited package or storage stability. Speed of condensation or cure response in the case of the etherified methylol group increases with increasing volatility of the alcohol used in the synthesis of the aminoplast. Methanol is more volatile than n-butanol, and those aminoplast crosslinkers, with methanol as the etherifying agent such as hexamethoxymethylmelamine, have a faster cure response than those with butanol as shall be later pointed out in Table 2.

Generally, the methylated versions of melamine- or benzoguanamine-formaldehyde derivatives cure faster, provide better compatibility with other coreactants, are more soluble in water, and confer greater chemical resistance to the final baked film. Due to the greater functionality of the melamine type of crosslinkers better hardness, bond strength and moisture resistance is achieved over the benzoguanamine crosslinkers.

The presence of acidity via free carboxyl groups in the alkyd coreactant acts as a "built in" catalyst in hastening crosslinking with the aminoplast and phenoplast components therein.

which have been methylated but still contain high methylol content. Cymel 1123 is a monomeric benzoguanamine-formaldehyde adduct which has been methylated and ethylated, while Cymel 1125 is the polymeric counterpart of 1123; both Cymel 1123 and 1125 contain very low methylol content.

Table 2

| Varnish Example | Varnishes with Various Triazine Derivatives | | | | | | | | | | | |
|---|---|---|---|---|---|---|---|---|---|---|---|---|
| | 22 | 23 | 24 | 25 | 26 | 27 | 28 | 29 | 30 | 31 | 32 | 33 |
| Alkyd conc. of Ex. 5 | 31.90 | 31.90 | 31.90 | 31.90 | 31.90 | 31.90 | 31.90 | 31.90 | 31.90 | 31.90 | 31.90 | 31.90 |
| Phenolic Resin Solution of Ex. 16 | 23.50 | 23.50 | 23.50 | 23.50 | 23.50 | 23.50 | 23.50 | 23.50 | 23.50 | 23.50 | 23.50 | 23.50 |
| DMEA | 2 | 2 | 2 | 2.60 | 2.50 | 2.09 | 2 | 2 | 2.09 | 2.16 | 2.09 | 2 |
| Butoxyethanol | 3.20 | 2.03 | 2.03 | 2.38 | 2.68 | 3.20 | 3.20 | 3.20 | 3.20 | 2.03 | 3.20 | 2.62 |
| Water (distilled) | 24.72 | 24.72 | 24.72 | 24.72 | 24.72 | 24.72 | 24.72 | 24.72 | 24.72 | 24.72 | 24.72 | 24.72 |
| Hexamethoxymethyl-melamine (HMMM) | 4.68 | | | | | | | | | | | |
| [1]Cymel 370-80 | | 5.85 | | | | | | | | | | |
| [2]Uformite MM-83 | | | 5.85 | | | | | | | | | |
| [1]Cymel 1125 | | | | 5.50 | | | | | | | | |
| [3]Resimene X-730 | | | | | 5.20 | | | | | | | |
| [1]Cymel 350 | | | | | | 4.68 | | | | | | |
| [1]Cymel 1123 | | | | | | | 4.68 | | | | | |
| [1]Cymel 1116 | | | | | | | | 4.68 | | | | |
| [3]Resimene X-755 | | | | | | | | | 4.68 | | | |
| [3]Resimene X-760 | | | | | | | | | | 5.85 | | |
| [3]Resimene X-764 | | | | | | | | | | | 4.68 | |
| [3]Resimene X-740 | | | | | | | | | | | | 5.26 |
| Liquid Properties | | | | | | | | | | | | |
| Viscosity at 25° C. G-H Scale | T | T¼ | T½ | U | Q | T½ | U | T½ | U | V½ | U¼ | T¼ |
| pH | 7.9 | 8.0 | 7.65 | 8.2 | 8.3 | 7.7 | 8.0 | 7.9 | 7.6 | 7.6 | 7.7 | 8.0 |
| % Solids | 52 | 52 | 52 | 52 | 52 | 52 | 52 | 52 | 52 | 52 | 52 | 52 |
| % Phenoplast (of total solids) | 35 | 35 | 35 | 35 | 35 | 35 | 35 | 35 | 35 | 35 | 35 | 35 |
| % Aminoplast (of total solids) | 10 | 10 | 10 | 10 | 10 | 10 | 10 | 10 | 10 | 10 | 10 | 10 |
| % Cosolvent | 40 | 40 | 40 | 40 | 40 | 40 | 40 | 40 | 40 | 40 | 40 | 40 |
| Baked Film Appearance | clear | clear | clear | clear | clear | clear | clear | clear | clear | clear | clear | clear |
| Al.Dish Cures | | | | | | | | | | | | |
| 1 hr at 163° C., 5 gms. | cured | cured | cured | cured | cured | cured | cured | cured | cured | cured | cured | cured |
| 20 gms. | cured | cured | cured | sk.liq. | cured | cured | sk.liq. | cured | sk.liq. | sk.liq. | sk.liq. | cured |
| 1½ hr at 163° C. 20 gms. | | | | cured | | | cured | | cured | sk.liq. | cured | |

[1]Registered trademark of American Cyanamid
[2]Registered trademark of Rohm and Haas
[3]Registered trademark of Monsanto The compatibilities of various triazine derivatives with a particular alkyd-phenolic resin system were tested. The alkyd of Example 5 and the phenolic resin of Example 16 were chosen for evaluation of this characteristic, as well as the speed of cure of 20 grams of varnish in an aluminum dish baked for one hour at 163° C. For details consult Table 2 attached.

In addition to hexamethoxymethylmelamine (HMMM), various other commercially available triazine derivatives were tested. They included the Resimenes (sold by Monsanto); Cymels (sold by American Cyanamide) and Uformite (sold by Rohm and Haas). Resimenes are amino resins and include products which are derived from the reaction of melamine, formaldehyde, and either n-butanol, isobutanol or methanol. Resimenes 730 and 740 are methylated melamines; Resimene 755 is a mixed ether (methyl and butyl) melamine, as is Resimene 764. Resimene 760 is a butylated melamine. Cymel is a trademark for a series of melamine-formaldehyde resin products. Cymel 350 is a methylated monomeric melamine-formaldehyde product, while Cymel 1116 is a methylated-ethylated-monomeric melamine-formaldehyde product. Cymel 370 and Cymel 380 are both polymeric melamine-formaldehyde products Uformite is the trademark for melamine formaldehyde and triazine condensates, supplied in aqueous solutions or solutions in volatile solvents.

All the triazine products were compatible in the various varnishes both in solution and in the cured state. Varnish Example 31 with Resimene X-760 of the butylated type was the most sluggish in curing properties of the entire series in that it was a skinned liquid after a bake of 1½ hours at 163° C. using the 20 g. Varnish Examples 25, 28, 30 and 32 required 1½ hours at 163° C. in the same test. Using a 5 g cure test method, these latter samples cured in one hour at 163°0 C.

To solubilize the inherently water-insoluble resinous coating components, the alkyd and the phenolic resin are separately predissolved in a solvent (or solvent mixtures) to a solids level ranging from 50 to 90% to facilitate the preparation of the final coating. Other techniques of coating preparation may be employed whereby the molten alkyd is added to a mixture of water, amine, cosolvent, phenolic resin and aminoplast and carefully adjusted to the desired liquid specifications.

In order to compound the coatings in a more facile manner the alkyd is diluted to 80% solids with a solvent to form a concentrate. The phenolic resin is treated in the same manner, except that its solids may range from 50 to 80%. The aminoplast is used at 80 to 100% solids, and its solvent may vary from water to a variety of primary, secondary or tertiary alcohols.

The incorporation of a polar solvent, as a component of a water/solvent blend, enhances the solubility of these coating compositions which may be soluble in a water/amine mixture alone. The solvent not only aids the package stability of the coating, but enhances the flow of the liquid film so that a smooth, continuous baked film is obtained.

Typical solvents that may be incorporated are polar solvents which are water-miscible. They include glycol ethers, glycol diethers, glycol ether acetates, diacetone alcohol, alcohols, and ketones.

The alkyds and phenolics are soluble in a variety of these solvents, and the various examples typify this.

The amount of cosolvent incorporated along with water may range from 20 to 65% of the total blend and preferably 20 to 50%. The cosolvent level is dependent on the amount and type of phenolic resin employed.

The three-component compositions of the invention and each component thereof can be dissolved in aromatic hydrocarbons or aromatic hydrocarbons admixed with aliphatic hydrocarbon and/or water immiscible solvents, as non-aqueous systems. Typical aromatic hydrocarbons include toluene, xylene, ethyl benzene and other alkylated benzenes. Typical adiphatic hydrocarbons are those including hexane, heptane, octane and higher alkanes of straight or branched chain. Typical water immiscible solvents include esters, ketones, ethers, alcohols.

To render these coating compositions water-soluble, various amines may be employed that react with the available carboxyl groups present in the alkyd and phenolic components to form amine salts thereof that are soluble in water. These amines may be of the alkyl, alkanolamine, or morpholine types. In general the tertiary amines work best from the standpoint of fast cure, and confer the least moisture sensitivity in the resultant baked film.

Typical examples of tertiary amines are:
triethyl amine
N,N-dimethyl ethanolamine
N,N-diethyl ethanolamine
N-methyl diethanolamine
N-ethyl diethanolamine
N-(2-hydroxyethyl) morpholine A sufficient quantity of amine is employed to raise the pH of the aqueous solution to a range of 7–9 and preferably 7.5 to 8.5.

Coatings prepared from formulations produced in accordance with the foregoing description are characterized in that they are: (a) water-soluble upon neutralization with an amine, (b) heat-curable protective coatings having superior moisture resistance, relatively high bond strengths and good thermal resistance, and (c) multi-component mixtures containing alkyd, phenolic and amino resins along with cosolvents, amines and water where the water content exceeds 25% of the total weight.

The varnishes of the invention are usually formed by admixing the following components at room or ambient temperature:

(a) alkyd concentrate at about 80% solids in a glycol ether, or other polar solvent,
(b) phenolic resin solution at 50–80% solids in a glycol ether,
(c) aminoplast or triazine curative at 80–100% solids in a primary alcohol or water
(d) tertiary amine at about 1.5–6% by weight of the varnish
(e) Water generally forms from about 30–75% of the total volatile content consisting of water, cosolvent and amine.
(f) The amount of total cosolvent ranges from about 20 to 65% of the total volatile content consisting of water, cosolvent and amine.

PREPARATION OF COATING COMPOSITIONS

Heretofore aqueous coatings of either the emulsion or solution type employed as impregnating varnishes in electrical insulation applications have exhibited serious deficiencies in moisture resistance. With the introduction of more stringent test methods for evaluating moisture resistance, many commercial aqueous coatings have not been acceptable compared to organic solvent-soluble coatings.

Earlier exposure conditions at either 25° C. or even 35° C. and 100% relative humidity with dew did not provide sufficiently rigorous conditions to effectively differentiate between the products of this invention and those of lesser performance. A test method of 70° C. and 100% relative humidity with dew (see Test Method) proved to be more stringent in screening the various candidates. Curing conditions or an optimum baking schedule play an important role in achieving higher moisture resistance values.

The choice of curatives of either a monomeric or polymeric type is of vital importance in achieving a high order of moisture resistance of 25,000 megohms and higher. Melamine- or urea-formaldehyde resins or monomeric derivatives thereof have proved woefully inadequate insofar as moisture resistance is concerned.

To illustrate the poor moisture resistance of varnishes compounded with an alkyd and an amino curing agent, such as hexamethoxymethylmelamine (HMMM), as the single curative at different levels of concentration of the curative the following data is presented in Table 3.

Table 3

| Varnish Example | Affect of Aminoplast Content on Moisture Resistance Parts by Weight, Grams | | | | | |
| --- | --- | --- | --- | --- | --- | --- |
| | 34 | 35 | 36 | 37 | 38 | 39 |
| Alkyd Concentrate of Ex. 5 (80.7% NV in butoxy-ethanol) | 272 | 300 | 280 | 388.6 | 349.75 | 360 |
| HMMM[1] | 54.9 | 100.8 | 146.3 | 78.4 | 121 | 188.1 |
| DMEA[2] | 15.4 | 16.5 | 15.4 | 22 | 19.80 | 19.8 |
| Butoxy-ethanol | 58.5 | 52.0 | 60.7 | 91.8 | 85.30 | 83.8 |

Table 3-continued
Affect of Aminoplast Content on Moisture Resistance
Parts by Weight, Grams

| Varnish Example | 34 | 35 | 36 | 37 | 38 | 39 |
|---|---|---|---|---|---|---|
| Water (distilled) | 443.7 | 462.8 | 484.3 | 250.2 | 228.40 | 242.2 |
| Liquid Properties | | | | | | |
| Viscosity at 25° C., G-H Scale | U½+ | V | U½+ | V | V+ | U½+ |
| % Solids | 32.49 | 36.79 | 37.75 | 47.17 | 50.14 | 53.54 |
| pH | 8.21 | 7.72 | 8.39 | 8.74 | 8.31 | 8.50 |
| Calculations for Curatives & Cosolvent | | | | | | |
| % Aminoplast (on total vehicle solids) | 20 | 29.4 | 39.3 | 20 | 30 | 39.3 |
| % Cosolvent (on solvent blend of water and cosolvent | 20 | 19.2 | 19.2 | 40 | 40 | 38.8 |
| Moisture Resistance, megohms | <2000 | <2000 | <2000 | 1137 | 1550 | <2000 |
| after hrs of Exposure | 120 | 144 | 120 | 72 | 72 | 24 |

[1]HMMM = Hexamethoxymethylmelamine
[2]DMEA = Dimethyl ethanolamine

PREPARATION OF COATING COMPOSITIONS

The moisture resistance was very poor for all these varnishes, irrespective of melamine content. Even poorer results were obtained with the higher cosolvent content.

By increasing the baking cycle from 2 hours at 163° C. to 4 hours at 175° C. on just the first two coats and then baking the remaining four coats for 2 hours at 163° C., an improvement in moisture resistance was noted for the best varnish in Table 3, namely Example 36. Moisture resistance data on this varnish at different baking schedules and exposure temperatures were as follows:

| Varnish Example 36 of Table 3 | | | | |
|---|---|---|---|---|
| Baking Schedule | | Moisture Resistance | | Bath |
| Time | Temperature | Megohms | Hours | Temperature |
| 2 Hrs. | 163° C. | <2000 | 144 | 70° C. |
| 4 Hrs. | 175° C. | 7600 | 168 | 70° C. |
| 4 Hrs. | 175° C. | Infinite | 168 | 35° C. |

The effect of bath temperature should be noted in the foregoing data as the value at 70° C. and the longer bake was still low in comparison to the infinite reading at 35° C. which indicated no change from the dye to the wet conditions.

To achieve more critical and meaningful data, a water bath temperature of 70° C. and 100% relative humidity with dew (see appended test method) was chosen to conduct all further tests. Thereafter the cure cycle was varied for the first two coats and kept constant at 163° C. for each of the next four coats.

Using these new water-dispersible phenolic resins in combination with the alkyds at levels of 20 to 50% of the former, and no other curatives, the respective varnishes were slow in curing. Deep dish samples (20 grams of varnish in an aluminum dish) did not completely cure after being heated for two hours at 163° C.

With the introduction of a combination of curing agents, such as a carboxylated phenolic resin and a triazine derivative, not only was the cure of varnishes accelerated, but a synergistic effect on its moisture resistance and bond strength was effected. A series of varnishes was prepared wherein the melamine content was held constant at 10% of the total coating solids and the phenolic resin content was varied. For details on moisture resistance values see Table 4.

Table 4
Affect of Phenolic Resin Content on Moisture Resistance
Parts by Weight, Grams

| Varnish No. | 40 | 41 | 42 | 43 | 44 | 45 |
|---|---|---|---|---|---|---|
| Alkyd Concentrate of Ex. 5 (88.7% NV in Butoxy ethanol) | 450 | 450 | 420 | 330 | 300 | 300 |
| Phenolic Solution of Ex. 16 (76.4% NV in Butoxy-ethanol) | 59.40 | 95.10 | 126.84 | 134.09 | 158.5 | 201.7 |
| HMMM[1] | 45.45 | 48.45 | 48.44 | 40.92 | 40.4 | 44 |
| DMEA[2] | 27.50 | 27.50 | 26 | 20.5 | 19 | 18.5 |

Table 4-continued
Affect of Phenolic Resin Content on Moisture Resistance
Parts by Weight, Grams

| Varnish No. | 40 | 41 | 42 | 43 | 44 | 45 |
|---|---|---|---|---|---|---|
| Butoxyethanol | 85.20 | 89.25 | 82.18 | 76.01 | 73.8 | 80.1 |
| Water (distilled) | 279 | 297.90 | 289.80 | 257.07 | 258.9 | 278.5 |
| Liquid Properties | | | | | | |
| Viscosity at 25° C., G-H Scale | U ½ | U ¾ | U ¾ | U ¼ | T | T |
| pH | 7.6 | 7.8 | 8.3 | 7.8 | 7.75 | 8.25 |
| % Solids | 48 | 48.8 | 48.8 | 47.7 | 47.5 | 47.7 |
| % Phenoplast (on total vehicle solids) | 10 | 15 | 20 | 25 | 30 | 35 |
| % Cosolvent (on solvent blend of water and cosolvent) | 40 | 40 | 40 | 40 | 39.5 | 40 |
| Moisture Resistance, megohms after | 14,300 | 26,600 | 19,000 | 63,300 | 131,600 | 800,000 |
| hrs. of Exposure | 168 | 168 | 168 | 168 | 168 | 168 |
| % Aminoplast (on total Vehicle Solids) | 10 | 10 | 10 | 10 | 10 | 10 |

As to the three component composition, the amount of phenolic resin component should be greater than 10% and then the combined amount of the triazine derivative and said phenolic resin should be at least 22% by weight based on the total weight of the three component composition of the invention, including alkyd, triazine derivative and phenolic resin. Generally based on the total weight the three component composition, the phenolic resin component can vary from greater than 10 to 50% (by weight) and the triazine derivative can vary from 10–50%. Practically, it should be noted that when the combined amount of phenolic resin and triazine is at about 65% by weight of the composition, some brittleness may be noted in the cured varnish of some of the coatings.

A significant improvement is noted when the phenolic content is increased from 20 to 25%, and each 5% incremental increase thereafter increases the moisture resistance values multifold. Values greater than 100,000 megohms after 168 hours or one week of exposure begin to have practical significance under these rigorous conditions.

Since the varnish of Example 45 indicated promise, it was decided to study it in depth. The effect of a variable baking schedule on moisture resistance was observed, and the results were as follows:

Table 5
Effect of Baking Schedule on Moisture Resistance

| Varnish Example | Baking Schedule Hrs. at 175° C. 1st & 2nd Coats | Hrs. at 175° C. 3rd thru 6th Coats | Moisture Resistance Megohms after 168 Hrs. |
|---|---|---|---|
| 45 | 2 | 2 | 1,250,000 |
|  | 2½ | 2 | 800,000 |
|  | 3 | 2 | 1,000,000 |
|  | 3½ | 2 | 900,000 |
|  | 4 | 2 | 800,000 |

Shorter bakes favor better moisture resistance, and varnish Example 45 has a wide latitude in curing characteristics that has no deleterious effect on this specific property.

In Table 6 the effect of moisture resistance of a somewhat higher constant melamine content at 15% of the total coating solids in combination with a variable phenolic content was as follows:

Table 6
Affect of Phenolic Resin on Moisture Resistance at Higher Melamine Resin Content.
Parts by Weight, Grams

| Varnish Example | 46 | 47 | 48 | 49 | 50 | 51 |
|---|---|---|---|---|---|---|
| Alkyd Concentrate of Ex. 5 (80.7% NV in butoxyethanol) | 450 | 450 | 420 | 390 | 300 | 300 |
| Phenolic Solution of Ex. 16 (76.4% NV in butoxyethanol) | 63.45 | 101.85 | 136.50 | 171.73 | 172.9 | 221.8 |
| HMMM[1] | 72.60 | 77.85 | 78.26 | 78.65 | 66 | 72.6 |
| DMEA[2] | 37 | 23.50 | 24.60 | 18.20 | 18 | 18 |
| Butoxyethanol | 92.45 | 95.10 | 88.34 | 87.49 | 71 | 77.1 |
| Water (distilled) | 300.30 | 309.15 | 302.54 | 305.11 | 254.5 | 280.9 |

Table 6-continued

Affect of Phenolic Resin on Moisture Resistance at Higher Melamine Resin Content.

| Varnish Example | Parts by Weight, Grams | | | | | |
|---|---|---|---|---|---|---|
| | 46 | 47 | 48 | 49 | 50 | 51 |
| Liquid Properties | | | | | | |
| Viscosity at 25°C. G-H Scale | U ¾ | U ¾ | T ¾ | Q | Q ¾ | Q ½ |
| pH | 8.1 | 8.0 | 7.75 | 7.9 | 7.8 | 7.8 |
| % Solids | 47.70 | 49.10 | 49.60 | 49.90 | 50 | 50 |
| % Phenoplast (on total vehicle solids) | 10 | 15 | 20 | 25 | 30 | 35 |
| % Aminoplast (on total vehicle solids) | 15 | 15 | 15 | 15 | 15 | 15 |
| % Cosolvent (on solvent blend of w water and cosolvent) | 40 | 40 | 40 | 40 | 40 | 40 |
| Moisture Reistance, megohms after hrs. of exposure | 14,600 168 | 27,300 168 | 75,000 168 | 145,000 168 | 533,000 168 | 800,000 168 |

Comparing the results of Table 6 with those of Table 4 at equivalent phenolic resin contents, higher moisture resistance values were obtained at higher melamine contents at the range of 20–30% of phenolic resin content.

At the lower phenolic resin levels, namely less than 25% of the total vehicle solids of the phenolic curative, the moisture resistance values were acceptable but below 100,000 megohms generally.

In Table 7 moisture resistance values are reported at the 20 and 25% levels of melamine curative.

Table 7

Affect of Phenolic Resin on Moisture Resistance at Melamine Resin Content of 20-25%.

| Varnish Example | Parts by Weight, Grams | | | | | |
|---|---|---|---|---|---|---|
| | 52 | 53 | 54 | 55 | 56 | 57 |
| Alkyd Concentrate of Ex. 5 (at 80.7% NV in Butoxy-ethanol) | 402.75 | 371.75 | 340.75 | 371.75 | 340.75 | 309.80 |
| Phenolic Solution of Ex. 16 (at 76.4% NV in Butoxy-ethanol) | 110 | 146.65 | 183.25 | 110 | 146.65 | 183.25 |
| HMMM[1] | 100 | 100 | 100 | 125 | 125 | 125 |
| DMEA[2] | 25 | 23 | 21 | 23 | 21 | 19 |
| Butoxy-ethanol | 76 | 71.20 | 66.40 | 82.85 | 78 | 73.15 |
| Water (distilled) | 283.25 | 284.40 | 285.60 | 284.40 | 285.60 | 286.80 |
| Liquid Properties | | | | | | |
| Viscosity at 25° C., G-H Scale | T ½ | P ½ | O ¼ | O ¼ | N ½ | J+ |
| pH | 8.2 | 8.3 | 8.1 | 8.15 | 8.2 | 8.2 |
| % Solids | 50.15 | 50.15 | 50.15 | 50.15 | 50.15 | 50.15 |
| % Phenoplast (on total vehicle solids) | 15 | 20 | 25 | 15 | 20 | 25 |
| % Aminoplast (on total vehicle solids) | 20 | 20 | 20 | 25 | 25 | 25 |
| % Cosolvent (on solvent blend of water and cosolvent) | 40 | 40 | 40 | 40 | 40 | 40 |
| Moisture resistance, megohms after hrs. of Exposure | 36,700 168 | 55,000 168 | 116,750 168 | 30,000 168 | 30,750 168 | 300,000 168 |

Alkyds of various oil lengths and different types of oils of the drying and non-drying types were used in preparing aqueous varnishes at two different phenolic curative levels. See Tables 8 and 9 for details.

Table 8

Affect of Oil Type and Length on Moisture Resistance.

| Varnish Example | \multicolumn{8}{c}{Parts by Weight, Grams} | | | | | | | |
|---|---|---|---|---|---|---|---|---|
| | 58 | 59 | 60 | 61 | 62 | 63 | 64 | 65 |
| Phenolic Solution of Ex. 16 (at 69.7% NV in BE*) | 235 | 235 | 235 | 329 | 973** | 352.5 | 305.5 | 305.5 |
| HMMM[1] | 70.2 | 70.2 | 70.2 | 98.28 | 290 | 105.3 | 91.3 | 91.3 |
| DMEA[2] | 24.6 | 20.8 | 24.3 | 33.62 | 72 | 30 | 26.8 | 26.4 |
| Butoxyethanol | | | 1.35 | | 29.4 | | | |
| Water (distilled) | 140 | 140 | 196.55 | 223.64 | 1119 | 262.8 | 182 | 211 |
| Alkyd Concentrate of Ex. 1 (at 80% NV in BE* 14.5% oil-drying) | 292.5 | | | | | | | |
| Alkyd C*** (80% in NV in BE) Ex. 2 20.3% oil-drying | | 292.5 | | | | | | |
| Alkyd C.(80% NV in BE) Ex. 3 25.3% oil-drying | | | 292.5 | | | | | |
| Alkyd C. (80% NV in BE) Ex. 4 31% oil-drying | | | | 409.50 | | | | |
| Alkyd C. (80% NV in BE) Ex. 5 46.9% oil-drying | | | | | 1200 | | | |
| Alkyd C.(80% NV in BE) Ex. 6 60.5% oil-drying | | | | | | 390 | | |
| Alkyd C. (80% NV in BE) Ex. 7 23.6% oil-non-drying | | | | | | | 380.25 | |
| Alkyd C. (80% NV in BE) Ex. 8 41.3% oil-non-drying | | | | | | | | 380.3 |
| Liquid Properties | | | | | | | | |
| Viscosity at 25° C. G-H Scale | O+ | T½ | J | Q½ | N¼ | M+ | M | P |
| pH | 7.8 | 7.7 | 7.8 | 7.7 | 7.7 | 7.7 | 7.7 | 7.7 |
| % Solids | 61.4 | 61.7 | 57.1 | 59.9 | 50 | 67.6 | 61.7 | 60 |
| % phenoplast (on total solids) | 35 | 35 | 35 | 35 | 35 | 35 | 35 | 35 |
| % Aminoplast (on total solids) | 15 | 15 | 15 | 15 | 15 | 15 | 15 | 15 |
| % Co-solvent | 48 | 48 | 40 | 44.8 | 40 | 57.1 | 48.1 | 44.4 |
| Moist. Resist. Megohms After 168 Hrs. of Exposure | 33,500 | 120,000 | 103,350 | 80,000 | 367,000 | 28,000 | 46,000 | 28,000 |
| Bond Strength lbs. at 25° C. | 33.5 | 38.2 | 45.1 | 40.3 | 56.0 | 35.8 | 51.8 | 46.5 |
| 150° C. | 4.7 | 6.6 | 5.4 | 5.6 | 11.2 | 7.4 | 6.2 | 6.4 |

*BE = Butoxyethanol
**Ex. 16 at 76.4% NV in Butoxyethanol
***C = Concentrate

Table 9

Affect of Oil Length and Type on Moisture Resistance and Bond Strength at a Constant Phenolic Resin Content of 50%.

| Varnish Example | 66 | 67 | 68 | 69 | 70 | 71 | 72 | 73 |
|---|---|---|---|---|---|---|---|---|
| Phenolic Solution of Ex. 16 (at 69.7% NV in butoxyethanol) | 335.70 | 335.70 | 335.70 | 503.55 | 265 | 503.6 | 470 | 436.5 |
| HMMM[1] | 70.20 | 70.20 | 70.20 | 105.30 | 55 | 105.3 | 98.3 | 91.3 |
| DMEA[2] | 20.5 | 16 | 18.50 | 26.05 | 10 | 30 | 20.5 | 23.4 |
| Butoxyethanol |  |  |  |  | 45 |  |  |  |
| Water (distilled) | 80 | 80 | 80 | 130.90 | 234 | 258.2 | 112 | 100 |
| Alkyd Concentrate of Ex.1 (80% NV in butoxyethanol 14.5% oil (drying)) | 204.75 |  |  |  |  |  |  |  |
| Alkyd Concentrate of Ex.2 (80% NV in butoxyethanol 20.3% oil (drying)) |  | 204.75 |  |  |  |  |  |  |
| Alkyd Concentrate of Ex.3 (25.3% oil (drying)) |  |  | 204.75 |  |  |  |  |  |
| Alkyd Concentrate of Ex.4 (31% oil (drying)) |  |  |  | 307.20 |  |  |  |  |
| Alkyd Concentrate of Ex.5 (46.9% oil (drying)) |  |  |  |  | 160 |  |  |  |
| Alkyd Concentrate of Ex.6 (60.5% oil (drying)) |  |  |  |  |  | 273 |  |  |
| Alkyd Concentrate of Ex.7 (23.6% oil (drying)) |  |  |  |  |  |  | 287.6 |  |
| Alkyd Concentrate of Ex.8 (41.3% oil (drying)) |  |  |  |  |  |  |  | 266.2 |
| Liquid Properties |  |  |  |  |  |  |  |  |
| Viscosity at 25° C., G-H Scale | M¼ | Q½ | N¼ | O | E¼ | L | M½ | P |
| pH | 7.8 | 7.7 | 7.8 | 7.9 | 7.9 | 8.0 | 7.6 | 7.9 |
| % Solids | 65.8 | 66.2 | 66 | 65.4 | 49 | 69.44 | 66.3 | 66.3 |
| % Phenoplast (on total solids) | 50 | 50 | 50 | 50 | 50 | 50 | 50 | 50 |
| % Aminoplast (on total solids) | 15 | 15 | 15 | 15 | 15 | 15 | 15 | 15 |
| % Cosolvent | 64.1 | 64.1 | 64 | 62 | 40 | 58.2 | 64.1 | 65 |
| Moisture Resistance, megohms | 150,000 | 800,000 | 333,000 | 500,000 | 1,167,000 | 150,000 | 800,000 | 400,000 |
| Hours of exposure | 168 | 168 | 168 | 168 | 168 | 168 | 168 | 168 |
| Bond Strengths (ASTM D-2519) |  |  |  |  |  |  |  |  |
| lbs. at 25° C. | 31.2 | 38.7 | 36.1 | 41.0 | 48.1 | 52.0 | 43.0 | 32.0 |
| lbs. at 150° C. | 10.4 | 11.6 | 11.9 | 11.8 | 17.8 | 15.2 | 12.6 | 8.1 |

In Table 8 all the varnishes contained 35% of phenolic resin of Example 16 (based on total vehicle solids) and 15% of hexamethoxymethylmelamine (HMMM) as curatives. Varnishes 59, 60 and 62 had moisture resistance values which exceeded 100,000 megohms (better than most commercial solvent-based varnishes) after 168 hours of exposure at 70° C. and 100% relative humidity with dew. In addition excellent hot bond strengths ranging from 5 to 11 lbs. at 150° C. were obtained with alkyd of Examples 2, 3 and 5, which are higher than the 1 to 4 lbs. obtained with conventional solvent-based varnishes.

For even higher bond strengths of 11 to 18 lbs. at 150° C., along with higher moisture resistance values, Table 9 has many examples to offer, and varnishes 70 and 71 are outstanding in this respect. All those varnishes are at a 50% phenolic resin level based on total vehicle solids.

There are a number of phenolic resin examples compounded with alkyd of Example 5 that have excellent moisture resistance values and bond strengths. They are listed in Tables 10 and 11.

The moisture resistance values and bond strengths are considerably higher in Table 11 than in Table 10 and are a function of phenolic resin content; Table 11 varnishes have 50% phenolic resin (on total vehicle solids) vs. 35% in Table 10. Also, certain of the phenolic resins require a higher cosolvent content for solubility in an aqueous system.

Varnishes were prepared like those of Examples 62 and 70 of Tables 8 and 9, respectively with the alkyd of Example 5, except for replacing butoxyethanol as the cosolvent with the other glycol ethers previously cited. In all instances, the varnishes were clear both in solution form at a constant cosolvent level of 40% of total solvents and in the baked film. They all cured in a 20 gram deep section within one hour at 163° C.

The water tolerance of these varnishes is dependent mainly on the phenolic resin employed, and the initial cosolvent level employed.

Table 10

Affect of Different Phenolic Resins on Moisture Resistance and Bond Strength at 10%–15% Melamine Resin Content.

| Varnish Example | 74 | 75 | 76 | 77 | 78 | 79 | 80 |
|---|---|---|---|---|---|---|---|
| Alkyd conc. of Ex. 5 | 350.9 | 350.9 | 350.9 | 382.80 | 319 | 319 | 319 |
| HMMM[1] | 51.5 | 51.5 | 51.5 | 77.22 | 77.22 | 77.22 | 77.22 |
| DMEA[2] | 22 | 22 | 20 | 23.98 | 19.80 | 19.80 | 19.80 |
| Butoxyethanol | 50.2 | 80.7 | 50.2 | 106.63 | 77.22 | — | — |
| Water (distilled) | 271.9 | 271.9 | 271.9 | 362.51 | 305.64 | 267.52 | 262.24 |
| Phenolic Resin Soln. of Ex. 18 | 243.5 |  |  |  |  |  |  |

Table 10-continued
Affect of Different Phenolic Resins on Moisture Resistance and Bond Strength at 10%-15% Melamine Resin Content.

| Varnish Example | Parts by Weight, Grams | | | | | | |
|---|---|---|---|---|---|---|---|
| | 74 | 75 | 76 | 77 | 78 | 79 | 80 |
| Phenolic Resin Soln. of Ex. 10 | | 213 | | | | | |
| Phenolic Resin Soln. of Ex. 9 | | | 243.5 | | | | |
| Phenolic Resin Soln. of Ex. 13 | | | | 189.86 | | | |
| Phenolic Resin Soln. of Ex. 14 | | | | | 300.30 | | |
| Phenolic Resin Soln. of Ex. 20 | | | | | | 307.45 | |
| Phenolic Resin Soln. of Ex. 17 | | | | | | | 311.74 |
| Liquid Properties | | | | | | | |
| Viscosity at 25° C., G-H scale | $V_4^3$ | $R_2^1$ | V | $S_2^1$ | $Q_4^3$ | $T_4^3$ | 0 |
| pH | 8.1 | 7.6 | 7.8 | 8.0 | 8.1 | 8.3 | 8.0 |
| % Solids | 52 | 52 | 52 | 45 | 49.33 | 52 | 52 |
| % Phenoplast (on total solids) | 35 | 35 | 35 | 25 | 35 | 35 | 35 |
| % Aminoplast (on total solids) | 10 | 10 | 10 | 15 | 15 | 15 | 15 |
| % Cosolvent | 40 | 40 | 40 | 40 | 40 | 41.5 | 42.4 |
| Moisture Resistance, megohms | 125,000 | 93,000 | 126,000 | 25,000 | 200,000 | 25,000 | 56,000 |
| hrs. exposure | 168 | 168 | 168 | 168 | 168 | 168 | 168 |
| Bond Strengths (ASTM D-2519) | | | | | | | |
| lbs. at 25° C. | 37.6 | 42.6 | 40.4 | 32.0 | 34.8 | 35.8 | 39.1 |
| lbs. at 150° C. | 4.4 | 7.8 | 5.5 | 3.96 | 5.5 | 4.3 | 6.4 |

Table 11
Affect on Moisture Resistance and Bond Strength of Different Phenolic Resins

| Varnish Example | Parts by Weight, Grams | | | | | |
|---|---|---|---|---|---|---|
| | 81 | 82 | 83 | 84 | 85 | 86 |
| Alkyd conc. of Ex. 5 | 243.60 | 263.90 | 263.90 | 263.90 | 266.24* | 284.20 |
| HMMM[1] | 84.24 | 91.26 | 91.30 | 91.26 | 91.26 | 98.28 |
| DMEA[2] | 18 | 24.11 | 15 | 16.51 | 23 | 16.80 |
| Butoxyethanol | 32.52 | 45.03 | 56.70 | 69 | | 20 |
| Methoxypropanol | | | | | 38.89 | |
| Water (distilled) | 178.20 | 217.12 | 176.20 | 160 | 91 | 92.72 |
| Phenolic Resin Soln. of Ex. 18 | 379.44 | | | | | |
| Phenolic Resin Soln. of Ex. 10 | | 359.58 | | | | |
| Phenolic Resin Soln. of Ex. 9 | | | 411.10 | | | |
| Phenolic Resin Soln. of Ex. 13 | | | | 448.63 | | |
| Phenolic Resin Soln. of Ex. 21 | | | | | 455.39 | |
| Phenolic Resin Soln. of Ex. 14 | | | | | | 546 |
| Liquid Properties | | | | | | |
| Viscosity at 25° C., G-H scale | P⁻ | P | R | Q | $P_4^3$ | $Q_2^1$ |
| pH | 7.9 | 7.85 | 8.0 | 7.9 | 8.05 | 7.75 |
| % Solids | 53.3 | 60.2 | 60 | 56.1 | 63 | 61.9 |
| % Phenoplast (on total solids) | 50 | 50 | 50 | 50 | 50 | 50 |
| % Aminoplast (on total solids) | 15 | 15 | 15 | 15 | 15 | 15 |
| % Cosolvent | 43.7 | 40 | 54.9 | 50.2 | 72.8 | 81.3 |
| Moisture Resistance, megohms | 400,000 | 200,000 | 250,000 | 266,000 | 50,000 | 1,116,000 |
| hrs. of exposure | 168 | 168 | 168 | 168 | 168 | 168 |
| Bond Strengths (ASTM D-2519) | | | | | | |
| lbs. at 25° C. | 44.3 | 35.9 | 37.5 | 44.1 | 42.5 | 31 |
| lbs. at 150° C. | 7.4 | 13.5 | 11.8 | 6.1 | 5.6 | 8 |

*Ex. 5 thinned in methoxypropanol

MOISTURE RESISTANCE TEST METHOD

Test Procedure

An outline of the test procedure involved is set forth below:

(1) Five brass rods are used ($\frac{1}{4}"\times 6"$—both ends rounded off). These rods are carefully cleaned, polished and dried before use.

(2) The insulating varnish to be tested is diluted so that, when a copper panel is dipped and baked, the resulting dried film is 1.0 mil±0.1 mil thick.

(3) After the varnish has been adjusted, as described in step #2 above, the rods are dipped and baked (reversing the rod direction after each dip and bake cycle) until an overall cured film build of 6.5-7.5 mils is obtained. The temperature and time of each bake will effect the final results.

(4) Water bath—a water bath capable of controlling the temperature at 70° C.±1° C. is used as the test chamber. The approximate dimensions are 1½ to 2 feet in length, 1 foot wide and approximately ¾ of a foot deep. This chamber is fitted with a plexiglass cover in which ¾ inch holes have been drilled. The plexiglass cover is sealed to the water bath forming a chamber, using a silicone (flexible) cement or caulking compound. Enough water is added to the chamber so that at 70° C. a water level of 2-3 inches is present. (Note: the rods must not touch the water surface.)

(5) The five previously prepared rods are inserted into rubber stoppers (4½ inches extending below bottom opening) and the tops are bared down to the brass by removing the varnish at that point. A bare piece of 24-AWG copper wire is wrapped around the lower part (10 turns) (part where varnish remains) and brought up through the rubber stopper by a slit in the side. In effect, the system consists of two electrodes separated by an insulator.

(6) Before the test is begun, a measurement should be taken at 500 volts potential. The reading for the resistance should be infinite since the film is theoretically continuous. Values starting at 1,000,000 megohms at 500 volts are acceptable.

(7) The five prepared rods are now inserted into the test chamber (which is stabilized at 70° C.±1° C.) and the remaining unused holes plugged with rubber stoppers.

(8) The first recorded reading is taken immediately at the time the rod is inserted in the hole. Readings are made after one hour, 24 hours, 48 hours, 72 hours, 96 hours, 120 hours and 144 hours and at 168 hours which terminate the test.

CHEMICAL RESISTANCE TESTS

Chemical resistance of varnishes, in accordance with the invention, were determined by measuring bond strengths (in pounds) of the varnishes according to ASTM test D2519, which is incorporated by reference herein. Measurements to reflect chemical resistance in accordance with that test were undertaken after exposing the varnishes to unleaded gas, xylene, acetone, 2% sodium hydroxide or 5% sulfuric acid. The measurement results are set forth below (in pounds); and a comparison between the varnish of Example 70 of this application and the commercially available alkyd Isonel-31 (U.S. Pat. No. 3,080,331) from Schenectady Chemicals, Inc. is set forth in Table 12.

Table 12

| Varnish | Chemical Resistance of Organic Solvent Type vs. Aqueous Type Varnish | | | | | | | | | |
|---|---|---|---|---|---|---|---|---|---|---|
| | Unleaded Gas 25° C. | 150° C. | Xylene 25° C. | 150° C. | Acetone 25° C. | 150° C. | 2% Sodium Hydroxide 25° C. | 150° C. | 5% Sulfuric Acid 25° C. | 150° C. |
| Isonel-31** after 24 hours (1 coil) | 4.8 | 0 | 3.7 | 0 | 3.7 | 0 | 40.8 | 2.8 | 42.0 | 3.1 |
| Isonel-31 after 168 hours (Average of 2 coils) | 3.3 (Av. of 7 coils) | 0 | 4.5 | 0 | 4.77 (Av. of 3 coils) | 0 | 32.1 (Av. of 3 coils) | 2.4 | 42.6 (Av. of 3 coils) | 2.4 |
| Ex. 70*** after 24 hours (1 coil) | 48.3 | 9.6 | 44.3 | 13.3 | 19.5 | 2.6 | 42.0 | 10.6 | 47.4 | 13.7 |
| Ex. 70 after 168 hours | 53.8 (Av. of 2 coils) | 12.8 | 40.1 | 7.9 | 14.4 (Av. of 3 coils) | 2.9 | 20.13 (Av. of 3 coils) | 8.7 | 37.7 (Av. of 3 coils) | 9.8 |
| Ex. 45 after 168 hours (6 coils) | 19.73 | | | | | | | | | |
| Rerun | | | | | | | | | | |
| Isonel, after 24 hours | | | | | | | 50.65* | 2.8* | 43.1* | 2.9* |
| Isonel, after 168 hours | | | | | | | 36.9* | 2.6* | 40.3* | 2.5* |
| Ex. 70, after 24 hours (Av. of 4 coils) | 47.3 | 13.2 | 43.9 | 10.1 | 23.5 | 3.3 | 45.3 | 11.3 | 47.2 | 11.8 |
| Ex. 70, after 168 hours | 48.4 | 12.6 | 33.2 | 8.1 | 9.4 | 3.1 | 2.52 | 7.8 | 39.7 | 10.1 |

*Average of 4 coils.
**Measurements in accordance with ASTM D2519 of the unexposed Isonel varnish gave 48.9 lbs. (at 25° C.) and 2.8 lb. (at 150° C.).
***Likewise, measurements in accordance with ASTM D2519 of the varnish of Example 70 of the above application, gave 55 lb. (at 25° C.) and 15.7 lb (at 150° C.), prior to exposure to unleaded gas, xylene, acetone, 2% sodium hydroxide or 5% sulfuric acid, while the varnish of Example 45 exhibited a bond strength of 50.53 lb at 25°, prior to exposure (measurement is average of 3 coils).

WATER DILUTION TESTS

The following tests were undertaken to determine the water dilution characteristics of the compositions of the invention.

In the first test 100 grams of the varnish of Example 45 which contained 40% butoxyethanol (BE) was tested; the percent is based on the total of the volatiles present in the varnish as well as the BE. Water was added to determine the haze point and cloud point (cloudiness - newsprint is no longer readable). The results were:

Water to a haze: 20.5 gm

Water to cloudiness: 24 gm

Then 100 grams of the varnish of Example 45 was treated with the solvent mixture H₂O/BE (ratio 90/10). The results were:

H₂O/BE [90/10] to a haze: 21 gm
H₂O/BE [90/10] to a cloudiness: 32.5 gm

When the solvent blend was varied to 80 (water): 20 (BE), addition of the solvent blend yielded higher haze and cloudiness points:

H₂O/BE [80/20] to a haze: 89 gm
H₂O/BE [80/20] to a cloudiness: 105.5 gm

The following additional tests were undertaken to establish the effect of varying the solvent level in the varnish to water tolerance of the varnish.

Effect of a Variable Solvent Level of Varnish EX. 45 on Water Tolerance or Dilutibility

| Modified Varnish EX. 45 (100 gm) | A | B | C | D | E | F | G | H | I |
|---|---|---|---|---|---|---|---|---|---|
| % BE* | 27.23 | 30 | 32.23 | 35 | 40 | 45 | 50 | 55 | 60 |
| Visc. | Z1 | Z⁻ | V½ | U¾ | N¼ | Q½ | N¾ | K½ | I¼ |
| pH | 7.55 | 7.6 | 7.6 | 7.9 | 7.7 | 7.7 | 7.6 | 7.6 | 7.75 |
| % Solids | 52 | 52 | 52 | 52 | 52 | 52 | 52 | 52 | 52 |
| + % PF | 35 | 35 | 35 | 35 | 35 | 35 | 35 | 35 | 35 |
| ++ % MF | 10 | 10 | 10 | 10 | 10 | 10 | 10 | 10 | 10 |
| Water Tolerance | | | | | | | | | |
| gms of varnish | 100 | 100 | 100 | 100 | 100 | 100 | 100 | 100 | 100 |
| gms of water to a haze | 16.5 | 8.5 | 17 | 17.5 | 20.5 | 38 | 68.5 | 91.5 | 101.5 |
| gms of water to a cloudiness | 9.0 | 9.5 | 18.5 | 19 | 24 | 46 | 75 | 103 | 110 |

*Butoxyethanol
+Amount of phenol resin used in accordance with the invention
++Amount of triazine derivative used in accordance with the invention.

The effect of solvent and water on the haze and cloudiness points of the varnish of Example 70 were determined, as above (for the varnish of Example 45 of the above application). The results are set forth below:

| | Water | 90/10,H₂O/BE | 80/20,H₂O/BE |
|---|---|---|---|
| Varnish Example 70 | 100 gms | 100 gms | 100 gms |
| Amount of Solvent to a haze | 4 gms | 6 gms | 34.5 gms |
| Amount of Solvent to a cloudiness (indistinct to news print) | 11 gms | 12.5 gms | 39 gms |

Effect of a Variable Solvent Level of Varnish Ex. 70 on Water Tolerance Control Ex. 70

| Modified Varnish Ex. 70 | A | B | C | D | E | F | G |
|---|---|---|---|---|---|---|---|
| % BE | 33.6 | 35 | 40 | 45 | 50 | 55 | 60 |
| Visc. | K½ | K | K¼ | G½ | E½ | E½ | E½ |
| pH | 7.6 | 7.8 | 7.8 | 7.8 | 7.7 | 7.6 | 7.6 |
| % Solids | 52 | 52 | 52 | 52 | 52 | 52 | 52 |
| % PF | 50 | 50 | 50 | 50 | 50 | 50 | 50 |
| % MF | 15 | 15 | 15 | 15 | 15 | 15 | 15 |
| Water Tolerance | | | | | | | |
| Varnish, gms | 100 | 100 | 100 | 100 | 100 | 100 | 100 |
| Water, gms to a haze | 0 | 3.25 | 4 | 15.4 | 19.45 | 27 | 35.15 |
| Water, gms to a cloudiness | 3.5 | 4.30 | 11 | 20.8 | 26.50 | 35.15 | 43.25 |

Effect of Various Solvents on Solubility, Cure and Water Tolerance of Modified Varnish Examples 45 and 70.

| Varnish | A | B | C | D | E | F | G | H | I | J | K | L | M | N |
|---|---|---|---|---|---|---|---|---|---|---|---|---|---|---|
| Cosolvent Type* | MP | EE | PP | BP | MDP | MDE | BE | MP | EE | PP | BP | MDP | MDE | BE |
| % | 40 | 40 | 40 | 40 | 40 | 40 | 40 | 40 | 40 | 40 | 40 | 40 | 40 | 40 |
| % PF** | 35 | 35 | 35 | 35 | 35 | 35 | 35 | 50 | 50 | 50 | 50 | 50 | 50 | 50 |
| % MF** | 15 | 15 | 15 | 15 | 15 | 15 | 15 | 15 | 15 | 15 | 15 | 15 | 15 | 15 |
| Visc. | S½ | K¾ | J | J¾ | O⁻ | T½ | N¼ | G½ | E½ | F+ | E½ | G½ | G½ | K¼ |
| pH | 7.9 | 7.7 | 7.75 | 7.8 | 7.65 | 7.75 | 7.7 | 7.8 | 7.8 | 7.65 | 7.8 | 7.8 | 7.9 | 7.8 |
| % Solids | 50.1 | 50.1 | 50 | 50.1 | 50.2 | 50.2 | 52 | 50.1 | 50.1 | 50.1 | 50.1 | 50.1 | 50.1 | 52 |
| Solution Appearance | clear | clear | clear | clear | clear | clear | clear | clear | clear | clear | clear | clear | clear | clear |
| Cures of Varnishes | | | | | | | | | | | | | | |
| Hr. at 163° C. | | | | | | | | | | | | | | |
| 5 gms | cured | cured | cured | cured | cured | cured | cured | cured | cured | cured | cured | cured | cured | cured |
| 20 gms | cured | cured | cured | cured | cured | cured | cured | cured | cured | cured | cured | cured | cured | cured |
| Water Tolerance | | | | | | | | | | | | | | |
| Varnish, gms | 100 | 100 | 100 | 100 | 100 | 100 | 100 | 100 | 100 | 100 | 100 | 100 | 100 | 100 |
| Water, gms to a haze | 3.5 | 23 | 14.5 | 13 | 19.5 | 3 | 20.5 | 2 | 7 | 5 | 8 | 2 | 5 | 4 |
| Water, gms to a | | | | | | | | | | | | | | |

-continued

Effect of Various Solvents on Solubility, Cure and Water Tolerance of Modified Varnish Examples 45 and 70.

| Varnish | A | B | C | D | E | F | G | H | I | J | K | L | M | N |
|---|---|---|---|---|---|---|---|---|---|---|---|---|---|---|
| cloudiness | 4.5 | 27 | 18.5 | 16 | 26.5 | 6 | 24 | 4.5 | 8.5 | 8 | 11 | 5.5 | 7 | 11 |

*MP is methoxypropanol
EE is ethoxyethanol
PP is propoxypropanol
BP is butoxypropanol
MDP is methoxydipropanol
MDE is methoxydiethanol
BE is butoxyethanol
**Amount of phenol resin, used in accordance with the invention
***Amount of triazine derivative used in accordance with the invention All percentages in the foregoing Examples and Tests are percents by weight, unless expressly indicated to be otherwise.

From the foregoing, it is seen that the invention resides in a composition comprising, consisting essentially of or consisting of an oil- or fatty acid modified alkyd, a phenolic resin and a triazine derivative or resin which exhibits unexpected advantages. The foregoing description is illustrative only as the invention is intended to be construed in a broad spirit in light of the claims appended hereto.

What is claimed is:

1. A composition comprising
   (A) an alkyd resin which is an oil or fatty acid modified alkyd;
   (B) a phenolic resin selected from the group consisting of (a) and (b) wherein
     (a) is the condensation product of formaldehyde and a mixture of (1), (2) and (3), wherein
       (1) is at least one ortho- or para-mono alkyl phenol and is present in an amount ranging from 50 to 90 mole percent of said mixture, wherein said alkyl contains 1 to 12 carbon atoms;
       (2) is a compound which contains at least two phenolic hydroxy groups and is present in an amount ranging from 3 to 20 mole percent of said mixture; and
       (3) is ortho-hydroxybenzoic acid, para-hydroxybenzoic acid, or an admixture thereof and is present in an amount ranging from 7 to 40 mole percent of said mixture, and
     (b) is a condensation product of formaldehyde and (4) and (5), wherein
       (4) is at least one ortho- or para-mono alkyl phenol, wherein said alkyl contains 1 to 12 carbon atoms, and
       (5) is 4,4'-bis(4-hydroxyphenyl) pentanoic acid or isomers thereof and is 3 to 15 mole percent of the admixture of (4) and (5); and
   (C) a triazine derivative, which is the reaction product of a melamine or benzoguanamine and formaldehyde and which contains as substituents at least two free methylol groups or at least one ether derivative of at least one of said methylol groups; at least one condensation product of said derivative; or admixtures thereof;
   wherein said phenolic resin (B) is present in an amount which is greater than 10% by weight of said composition;
   wherein the total weight of said phenolic resin (B) and said triazine derivative or condensation product (C) is at least 22% by weight of said composition;
   wherein (B) is present in an amount ranging from greater than 10 to 50 percent by weight of said composition and (C) is present in an amount ranging from 10–50 percent by weight of said resin; and
   wherein heat treatment of said composition at a temperature effective to cure it results in a product which exhibits a moisture resistance of at least 25,000 megohms.

2. The composition of claim 1, wherein said moisture resistance is greater than 250,000 megohms.

3. The composition of claim 1, wherein the combined amount of (B) and (C) is up to around 65 percent by weight of said composition.

4. The composition of claim 1, wherein said moisture resistance is greater than 750,000 megohms.

5. The composition of claim 1, wherein (1) is o-cresol, p-t-butylphenol, p-t-octylphenol, p-t-nonylphenol, p-t-dodecylphenol, or p-t-amylphenol.

6. The composition of claim 1, wherein (2) is 2,2-bis(4-hydroxy-phenyl)propane; 4,4'-sulfonyldiphenol, resorcinol or hydroquinone.

7. The composition of claim 1, wherein (3) is salicylic acid.

8. The composition of claim 1, wherein said phenolic resin is the condensation product of formaldehyde, p-t-butylphenol; 2,2-bis(4-hydroxyphenol)propane and salicylic acid.

9. The composition of claim 1, wherein the derivative (C) is etherified and is methylated.

10. The composition of claim 9 which further includes a butylated ether derivative of (C).

11. The composition of claim 1, wherein said alkyd is formed from Tall Oil Fatty Acids, isophthalic acid, trimethylolpropane, dipropylene glycol and trimellitic anhydride.

12. The composition of claim 11, wherein said moisture resistance is greater than 250,000 megohms.

13. The composition of claim 11, wherein said moisture resistance is at least 750,000 megohms.

14. The composition of claim 11, wherein (1) is p-t-butylphenol; (2) is 2,2-bis(4-hydroxyphenol)propane and (3) is salicylic acid.

15. An amine salt which is the reaction product of the composition of claim 1 and an amine which is an alkyl amine, an alkanolamine or a morpholine.

16. The amine salt of claim 15, wherein said amine is a tertiary amine.

17. The amine salt of claim 16, wherein said amine is triethyl amine; N,N-dimethyl ethanolamine; N,N-diethyl ethanolamine; N-methyl diethanolamine; N-ethyl diethanolamine or N-(2-hydroxyethyl)morpholine.

18. An amine salt which is the reaction product of the composition of claim 14, and an amine which is an alkyl amine, an alkanolamine or a morpholine.

19. An aqueous solution of the amine salt of claim 15.

20. The aqueous solution of claim 19, which includes a water-miscible solvent.

21. The aqueous solution of claim 20, wherein said water-miscible solvent is a glycol ether, a glycol diether, a glycol ether acetate, a diacetone alcohol, an alcohol or a ketone.

22. An admixture of the composition of claim 1, and an aromatic hydrocarbon, aliphatic hydrocarbon, polar water immiscible solvent or admixtures thereof.

23. A copper wire coated with the composition of claim 1.

24. A copper wire coated with the composition of claim 15.

25. The composition of claim 1, wherein the oil is soybean oil.

26. The composition of claim 1, wherein the alkyd resin is formed by reacting 3 to 60 weight percent of an alcoholic component with 40 to 97 weight percent of an acid component.

27. The composition of claim 26, wherein said acid component comprises trimellitic anhydride and an aromatic dicarboxylic component wherein the trimellitic anhydride is used in an amount of 0.1 to 0.5 mole per mole of aromatic dicarboxylic acid.

28. The composition of claim 26, wherein said acid component comprises a mixture of a dicarboxylic aromatic acid and a polycarboxylic compound which is an aliphatic polycarboxcylic acid, a cycloaliphatic carboxylic acid or mixtures thereof and wherein the polycarboxylic component is present in an amount of 0.1 to 0.7 mole per mole of dicarboxylic aromatic acid.

29. The composition of claim 26, wherein the acid component comprises 25 to 75 mole percent of trimellitic anhydride and an aliphatic diacid, a cycloaliphatic diacid or mixtures of an aliphatic diacid and a cycloaliphatic diacid with the remainder being an aromatic dicarboxylic acid.

* * * * *

UNITED STATES PATENT AND TRADEMARK OFFICE
CERTIFICATE OF CORRECTION

PATENT NO. : 4,196,109
DATED : April 1, 1980
INVENTOR(S) : Deno Laganis and Eric Garis It is certified that error appears in the above—identified patent and that said Letters Patent is hereby corrected as shown below:

Column 2, line 64, change "1.501" to --1.50/1--.

Column 14, line 58, change "163°0C" to --163°C--.

Column 15, line 31, change "adiphatic" to --aliphatic--.

Column 18, line 28, change "dye" to --dry--.

Table 10, column 27, under the heading "Varnish Example 79" the viscosity at 25°C should read "R 3/4" in place of "T 3/4"

Signed and Sealed this

Twenty-fifth Day of May, 1993

Attest:

MICHAEL K. KIRK

Attesting Officer

Acting Commissioner of Patents and Trademarks